US 9,165,205 B2

(12) United States Patent
Mutsuo et al.

(10) Patent No.: US 9,165,205 B2
(45) Date of Patent: *Oct. 20, 2015

(54) IMAGE PROCESSING DEVICE GENERATING CHARACTER IMAGE AND BACKGROUND IMAGE ON THE BASIS OF CONNECTED PIXEL GROUP

(71) Applicant: KYOCERA DOCUMENT SOLUTIONS INC., Osaka (JP)

(72) Inventors: Toshiaki Mutsuo, Osaka (JP); Masaki Baba, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 47 days.

This patent is subject to a terminal disclaimer.

(21) Appl. No.: 14/089,415

(22) Filed: Nov. 25, 2013

(65) Prior Publication Data

US 2014/0147038 A1 May 29, 2014

(30) Foreign Application Priority Data

Nov. 27, 2012 (JP) ................................ 2012-258798

(51) Int. Cl.
*G06K 9/00* (2006.01)
*G06K 9/34* (2006.01)

(52) U.S. Cl.
CPC .............. *G06K 9/34* (2013.01); *G06K 2209/01* (2013.01)

(58) Field of Classification Search
None
See application file for complete search history.

(56) References Cited

U.S. PATENT DOCUMENTS

| 7,280,599 | B2 * | 10/2007 | Karczewicz et al. | .... 375/240.17 |
|---|---|---|---|---|
| 2002/0037100 | A1 | 3/2002 | Toda et al. | |

| 2005/0180645 | A1 | 8/2005 | Hasegawa et al. |
|---|---|---|---|
| 2005/0180649 | A1 | 8/2005 | Curry et al. |

(Continued)

FOREIGN PATENT DOCUMENTS

| JP | H09-161078 A | 6/1997 |
|---|---|---|
| JP | 2005-012768 A | 1/2005 |

(Continued)

OTHER PUBLICATIONS

The extended European search report issued by the European Patent Office on Sep. 25, 2014, which corresponds to European Patent Application No. 13192290.8-1901 and is related to U.S. Appl. No. 14/089,415.

(Continued)

*Primary Examiner* — Bhavesh Mehta
*Assistant Examiner* — Feng Niu
(74) *Attorney, Agent, or Firm* — Studebaker & Brackett PC

(57) ABSTRACT

In an image processing device, an edge image generation part detects an edge in an original image and generates an edge image constituted from the detected edge. A connected pixel extraction part extracts connected pixel groups in the edge image. A binary image generation part classifies the connected pixel groups under respective colors of the connected pixel groups, and generates a character image for each color. A background image generation part generates a background image of the original image based on the character image so that a pixel value at the position of the character image in the original image is set by an average value of the pixel values in the original image with regard to at least a portion of pixels around a rectangle circumscribing the connected pixel groups. An image compression part compresses respective image data of the character image and background image by different compression manners.

5 Claims, 3 Drawing Sheets

(56) References Cited

U.S. PATENT DOCUMENTS

| | | |
|---|---|---|
| 2009/0110313 A1 | 4/2009 | Sakaue |
| 2010/0067023 A1 | 3/2010 | Ito |
| 2010/0158365 A1 | 6/2010 | Ishida |
| 2010/0329551 A1 | 12/2010 | Yamazaki |
| 2014/0146072 A1* | 5/2014 | Mutsuo et al. ............ 345/589 |
| 2014/0147036 A1* | 5/2014 | Mutsuo et al. ............ 382/164 |
| 2014/0177958 A1* | 6/2014 | Mutsuo et al. ............ 382/166 |
| 2015/0003728 A1* | 1/2015 | Nanbu et al. ............ 382/165 |

FOREIGN PATENT DOCUMENTS

| | | |
|---|---|---|
| JP | 2005-228331 A | 8/2005 |
| JP | 2006-050548 A | 2/2006 |
| JP | 2006-054712 A | 2/2006 |
| JP | 2006-197178 A | 7/2006 |
| JP | 2009-093319 A | 4/2009 |
| JP | 2009-105808 A | 5/2009 |
| JP | 2010-074540 A | 4/2010 |
| JP | 2011-004302 A | 1/2011 |
| JP | 2011-009924 A | 1/2011 |

OTHER PUBLICATIONS

An Office Action; "Notice of Reasons for Rejection," isseud by the Japanese Patent Office on Oct. 22, 2014, which corresponds to Japanese Patent Application No. 2012-258798 and is related to U.S. Appl. No. 14/089,415.

* cited by examiner

IMAGE PROCESSING DEVICE GENERATING CHARACTER IMAGE AND BACKGROUND IMAGE ON THE BASIS OF CONNECTED PIXEL GROUP

INCORPORATION BY REFERENCE

This application is based on and claims the benefit of priority from Japanese Patent application No. 2012-258798 filed on Nov. 27, 2012, the entire contents of which are incorporated herein by reference.

BACKGROUND

The present disclosure relates to an image processing device.

When a character and a background image are separated from an original image and then image data of the character and image data of the background image are separately compressed, in a certain image processing device, the character and the background image are separated from the original image by region analysis processing. Then, a pixel value at the position of the character in the background image is determined by values of pixels around the character (i.e., pixels in contact with the outer periphery of the character).

Another image processing device identifies the position of a predetermined region containing a character portion in the background image by layout information, such as the line of a sentence, and fills the region with a color based on a color around the region.

However, in the technique of the former image processing device mentioned above, a processing speed is comparatively reduced due to the use of the region analysis processing. Further, because the values of the pixels around the character are used, when the color of the character runs to the pixels around the character in the original image, image quality after the compression will be degraded.

The technique described in the latter image processing device mentioned above cannot be used when the layout information is not present. Further, because the entire region is filled with the color around the region, image quality of the region filled with the color will be degraded.

SUMMARY

In accordance with an embodiment of the present disclosure, an image processing device includes an edge image generation part, a connected pixel extraction part, a binary image generation part, a background image generation part, and an image compression part. The edge image generation part detects an edge in an original image and then generates an edge image constituted from the detected edge. The connected pixel extraction part extracts connected pixel groups in the edge image. The binary image generation part classifies the connected pixel groups under respective colors of the connected pixel groups, and generates a character image being a binary image, for each of the colors. The background image generation part generates a background image of the original image on the basis of the character image. The image compression part respectively compresses image data of the character image and image data of the background image by compression manners that are different from each other. The background image generation part generates the background image in which a pixel value at the position of the character image in the original image is set by an average value of the pixel values in the original image with regard to at least a portion of pixels around a rectangle circumscribing the connected pixel groups.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

In the following, the embodiment of the present disclosure will be described with reference to the drawings.

Figure 1:
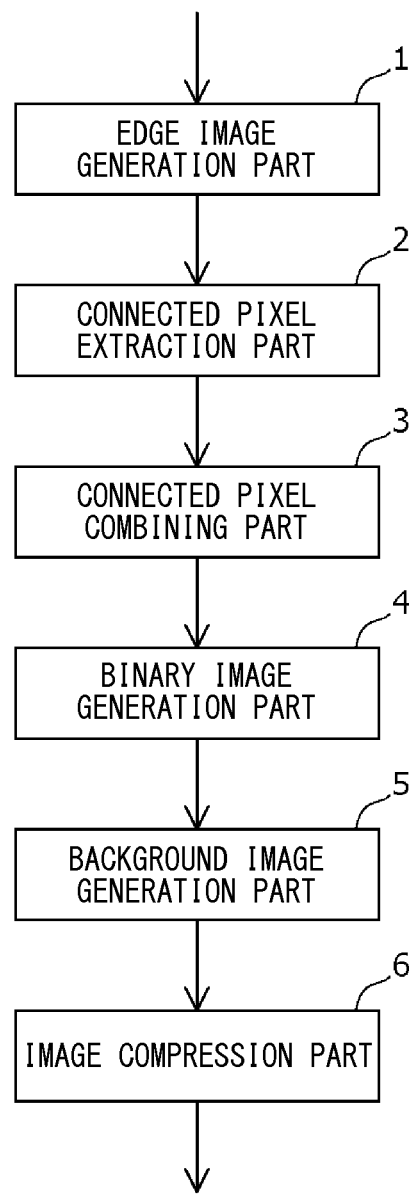
FIG. 1 is a block diagram showing a configuration of an image processing device according to an embodiment of the present disclosure.

FIG. 1 is a block diagram showing a configuration of an image processing device according to the embodiment of the disclosure. The image processing device shown in FIG. 1 is implemented by an ASIC (Application Specific Integrated Circuit), a computer or the like, for example. Image data of various images, such as an original image, are appropriately stored in a RAM (Random Access Memory), a non-volatile memory or the like. Then, the following processing parts are implemented by a processor in the ASIC or computer.

An edge image generation part 1 detects an edge in the original image and then generates an edge image constituted from the detected edge. In this embodiment, the edge image is an image indicating positions of pixels at a high-density side in the detected edge, and is a binary image. That is, the pixels at the high-density side in the detected edge have a pixel value of 1, and other pixels have a pixel value of 0.

In this embodiment, the original image is a multi-valued color image. The edge image generation part 1 generates an image having a brightness component of the original image, detects the edge in that image, and then generates the edge image constituted from the detected edge.

A connected pixel extraction part 2 extracts connected pixel groups within the edge image, and identifiably manages a string of connected pixels as one group. That is, when one connected pixel group and another connected pixel group are not connected, those connected pixel groups are respectively and identifiably managed as two groups. The connected pixel group is constituted from one single pixel or a plurality of pixels connected to each other, out of the above-mentioned pixels (pixels having the pixel value of 1) at the high-density side.

The connected pixel combining part 3 detects a plurality of the connected pixel groups whose circumscribing rectangles are close to each other, and groups those connected pixel groups as one connected pixel group. That is, when two connected pixel groups are grouped, those grouped connected pixel groups are managed as one connected pixel group. For example, in a case where the rectangles circumscribing the connected pixel groups partly overlap to each other, when a predetermined condition is established, those connected pixel groups are grouped. As the predetermined condition, a distance between the rectangles circumscribing the connected pixel groups being shorter than a predetermined value and the others may be pointed out.

A binary image generation part 4 classifies each of the connected pixel groups under respective colors (i.e., the respective colors in the original image) of the connected pixel groups, and then generates the image of a character for each of the colors. The character image is a binary image. At that time, the character image is generated on the basis of the connected pixel groups excluding the connected pixel groups being not correspondent to the character.

For example, a case where five connected pixel groups A to E are present is considered. Herein, It is assumed that the connected pixel groups A and B in the original image have a first color, that the connected pixel group C in the original image has a second color (different color from the first color), and that the connected pixel groups D and E in the original image have a third color (different color from the first and second colors). With respect to the first color, a character image is generated so that each pixel value at the positions of the connected pixel groups A and B is 1 and each pixel value at the other positions is 0. With respect to the second color, a character image is generated so that each pixel value at the position of the connected pixel group C is 1 and each pixel value at the other positions is 0. With respect to the third color, a character image is generated so that each pixel value at the positions of the connected pixel groups D and E is 1 and each pixel value at the other positions is 0.

A background image generation part 5 generates the background image of the original image on the basis of the above-mentioned character image. Specifically, the background image generation part 5 identifies, on the basis of the character image, the position of the character (i.e., positions of pixels having pixel values of 1) in the above-mentioned character image, and then, replaces the pixel value at the identified position in the original image in the following, thereby generating the background image.

The background image generation part 5 generates the background image in which the pixel value at the position of the character image (i.e. positions of pixels having pixel values of 1 in the character image) in the original image is set by the average value of the pixel values in the original image with regard to at least a portion of pixels around a rectangle circumscribing the connected pixel groups.

Figure 2A:
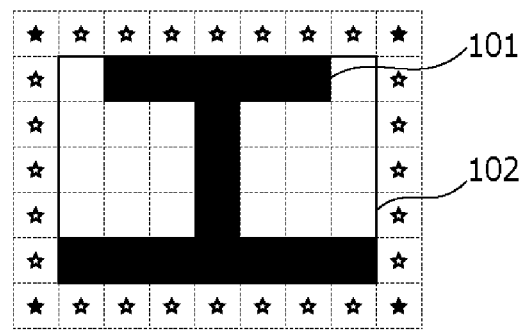
FIGS. 2A to 2C are diagrams respectively illustrating examples of connected pixel groups extracted by the image processing device according to the embodiment of the present disclosure.
Figure 2B:
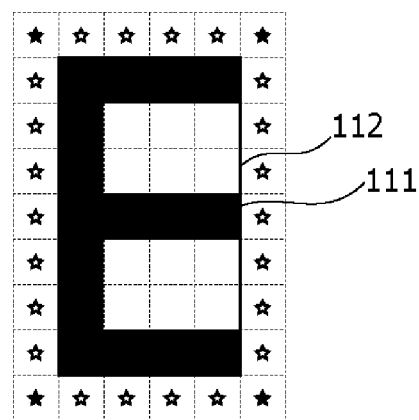
Figure 2C:
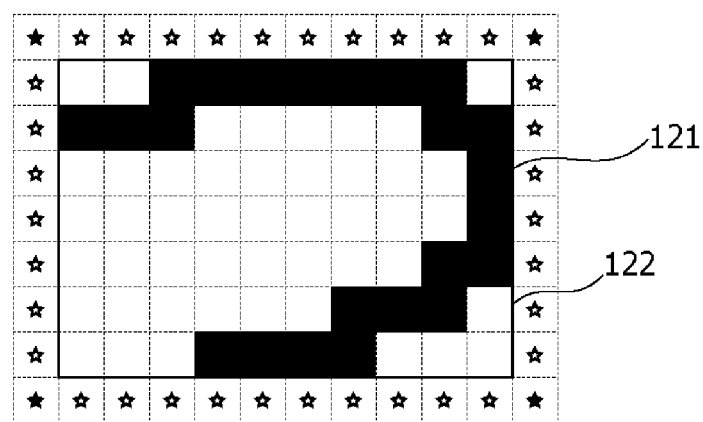

FIGS. 2A to 2C are diagrams respectively illustrating examples of connected pixel groups extracted by the image processing device shown in FIG. 1.

The example shown in FIG. 2A illustrates a case where a Japanese Katakana character of "e" is present in an original image. In this example, a connected pixel group 101 is detected, and a rectangle 102 circumscribing the connected pixel group 101 is identified. In this example, based on pixel values in the original image with regard to pixels indicated by star marks around the rectangle 102, a pixel value at the position of this connected pixel group 101 in a background image is determined.

The example shown in FIG. 2B illustrates a case where an alphabet character of "E" is present in an original image. In this example, a connected pixel group 111 is detected, and a rectangle 112 circumscribing the connected pixel group 111 is identified. In this example, based on pixel values in the original image with regard to pixels indicated by star marks around the rectangle 112, a pixel value at the position of this connected pixel group 111 in a background image is determined.

The example shown in FIG. 2C illustrates a case where a Japanese Hiragana character of "tsu" is present in an original image. In this example, a connected pixel group 121 is detected, and a rectangle 122 circumscribing the connected pixel group 121 is identified. In this example, based on pixel values in the original image with regard to pixels indicated by star marks around the rectangle 122, a pixel value at the position of this connected pixel group 121 in a background image is determined.

The background image generation part 5 may generate the background image in which a pixel value at the position of the character image in the original image is set by the average value of the pixel values in the original image with regard to all pixels around the above-mentioned rectangle.

The background image generation part 5 may generate the background image in which a pixel value at the position of the character image in the original image is set by the average value of the pixel values in the original image with regard to four pixels (pixels indicated by black star marks in each of FIGS. 2A to 2C) positioned at four vertices of the above-mentioned rectangle.

When grouped connected pixel groups are present, the binary image generation part 4 classifies the grouped connected pixel groups under respective colors of the grouped connected pixel groups, and then generates a character image for each of the colors. At that time, when the color of not-grouped connected pixel group and the color of the grouped connected pixel groups are the same, those connected pixel groups are included in a same character image. Then, the background image generation part 5 generates, with respect to the grouped connected pixel group, a background image in which a pixel value at the position of the character image in the original image is set by the average value of the pixel values in the original image with regard to at least a portion of pixels around a rectangle circumscribing the entire grouped connected pixel group.

An image compression part 6 compresses image data of the above-mentioned character image and image data of background image by respective compression manners that are different from each other. For example, the image data of the character image is compressed by an MMR (Modified Modified READ) manner, while the image data of the background image is compressed by a JPEG (Join Photographic Experts Group) manner. The number of the image data of the character images is the same as the number of the colors, and each of the image data is compressed. The value of each color is managed, in association with image data obtained after the compression of the character image of the color.

Next, operation of the image processing device will be described.

First, the edge image generation part 1 detects an edge in an original image, and then, generates an edge image constituted from the detected edge.

Next, the connected pixel extraction part 2 extracts connected pixel groups in the edge image, and then, identifiably manages a string of connected pixels as one group.

At that time, the connected pixel combining part 3 identifies the position and the size of a rectangle circumscribing each connected pixel group extracted by the connected pixel extraction part 2. When the connected pixel groups whose circumscribing rectangles are close to each other is present, the connected pixel combining part 3 detects the connected pixel groups whose circumscribing rectangles are close to each other, and groups those connected pixel groups as one connected pixel group.

Then, the binary image generation part 4 classifies the connected pixel groups under respective colors (i.e., the respective colors in the original image) of the connected pixel groups, and then, generates a character image for each of the colors.

In this way, the character image is generated for each color.

The background image generation part 5 generates the background image of the original image on the basis of the above-mentioned character image. At that time, as mentioned above, the background image generation part 5 generates the background image in which a pixel value at the position of the character image in the original image is set by the average value of the pixel values in the original image with regard to at least a portion of pixels around a rectangle circumscribing the connected pixel group.

In this way, the background image is generated.

Then, the image compression part 6 compresses image data of the above-mentioned character image and image data of background image by the respective compression manners that are different from each other.

In this way, the character image and the background image are separated from the original image, and the respective image data are separately compressed.

The image processing device according to the above-mentioned embodiment detects connected pixel groups each corresponding to a character reversed in density (i.e., a character having a density level lower than that of a background, hereinafter, called as "density reversed character"), such as an outline character, in the following. The binary image generation part 4 identifies to which of an ordinary character (character other than the density reversed character), the density reversed character, and a noncharacter the connected pixel group is correspondent, based on brightness values in an original image with regard to pixels at four vertices of a rectangle circumscribing the connected pixel group (that may be a grouped connected pixel group).

In this embodiment, when the brightness values in the original image with regard to the pixels at the four vertices of the rectangle circumscribing the connected pixel group (that may be the grouped connected pixel group) are all higher than a predetermined binary threshold value, the binary image generation part 4 decides that the connected pixel group is correspondent to the ordinary character. When the brightness values of the pixels at the four vertices of the rectangle are all lower than the binary threshold value, the binary image generation part 4 decides that the connected pixel group is correspondent to the density reversed character. Otherwise, the binary image generation part 4 decides that the connected pixel group is correspondent to the noncharacter.

In the case of the density reversed character, similarly to the case of the ordinary character, a character image is generated for each of colors of the density reversed characters, as illustrated in the embodiment. That is, the character image is generated for each of the density reversed character and the ordinary character, and no character image is generated for the noncharacter.

Figure 3A:
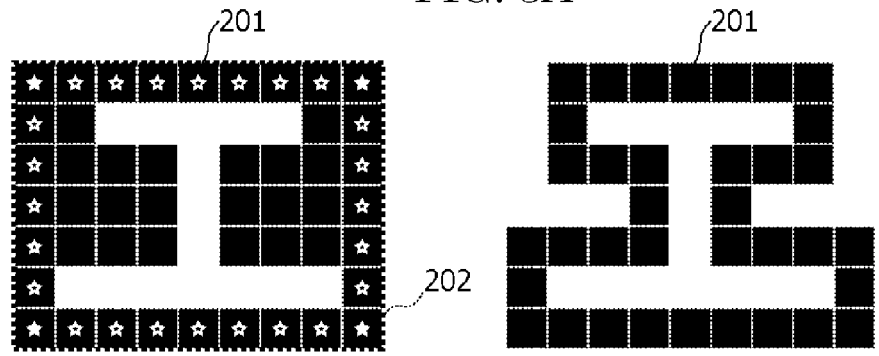
FIGS. 3A to 3C are diagrams respectively illustrating other examples of connected pixel groups extracted by the image processing device according to the embodiment of the present disclosure.
Figure 3B:
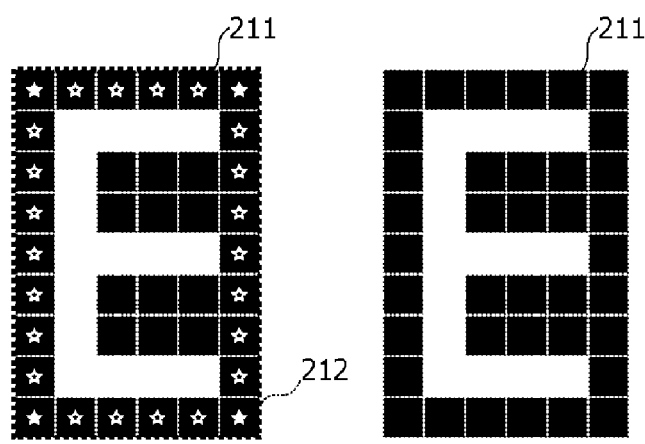
Figure 3C:
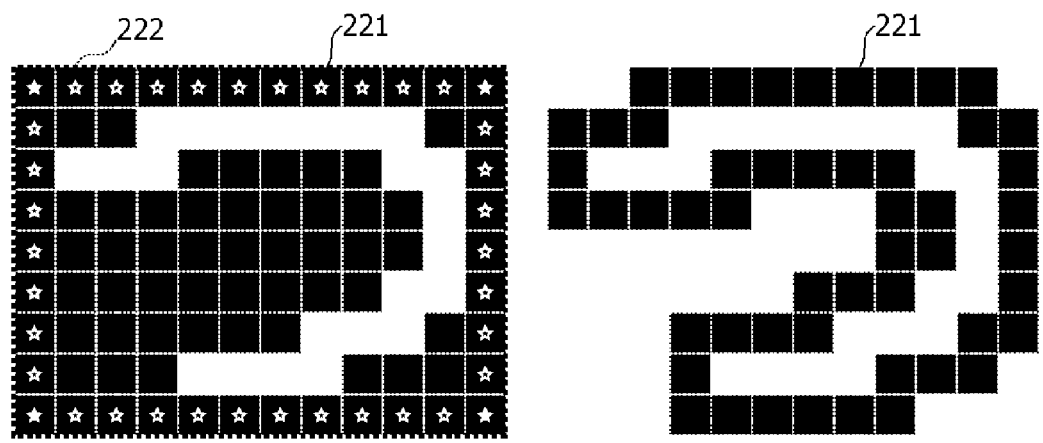

FIGS. 3A to 3C are diagrams respectively illustrating other examples of connected pixel groups extracted by the image processing device shown in FIG. 1

The example shown in FIG. 3A illustrates a case where an outline of the Japanese katakana character of "e" is present in an original image. In this example, a connected pixel group 201 is detected, and a rectangle 202 circumscribing the connected pixel group 201 is identified. Herein, this connected pixel group 201 is identified to be an outline character on the basis of brightness values in the original image with regard to pixels (pixels indicated by white star marks) at four vertices of the rectangle 202.

The example shown in FIG. 3B illustrates a case where an outline of the alphabet character of "E" is present in an original image. In this example, a connected pixel group 211 is detected, and a rectangle 212 circumscribing the connected pixel group 211 is identified. Herein, this connected pixel group 211 is identified to be an outline character on the basis of brightness values in the original image with regard to pixels (pixels indicated by white star marks) at four vertices of the rectangle 212.

The example shown in FIG. 3C illustrates a case where an outline of the Japanese hiragana character of "tsu" is present in an original image. In this example, a connected pixel group 221 is detected, and a rectangle 222 circumscribing the connected pixel group 211 is identified. Herein, this connected pixel group 221 is identified to be an outline character on the basis of brightness values in the original image with regard to pixels (pixels indicated by white star marks) at four vertices of the rectangle 222.

As described above, according to the above-mentioned embodiment, the edge image generation part 1 detects the edge in the original image, and then generates the edge image constituted from the detected edge. The connected pixel extraction part 2 extracts connected pixel groups in the edge image. The binary image generation part 4 classifies the connected pixel groups under respective colors of the connected pixel groups, and then, generates the character image being a binary image, for each of the colors. The background image generation part 5 generates the background image of the original image on the basis of the character image. At that time, the background image generation part 5 generates the background image in which a pixel value at the position of the character image in the original image is set by the average value of the pixel values in the original image with regard to at least a portion of pixels around a rectangle circumscribing the connected pixel groups. Then, the image compression part 6 respectively compresses image data of the character image and image data of the background image by the compression manners that are different from each other.

According to this, the character image and the background image may be separated from the original image at a comparatively high processing speed and with good quality, without using the region analysis processing and layout information.

The above-described embodiment is a preferred example of the present disclosure. The present disclosure, however, is not limited to this embodiment, and can be variously varied and modified without departing from the gist of the present disclosure.

The present disclosure may be applied to compression of image data, for example.

While the present disclosure has been described with reference to the particular illustrative embodiment, it is not to be restricted by the embodiment. It is to be appreciated that those skilled in the art can change or modify the embodiment without departing from the scope and spirit of the present disclosure.

What is claimed is:

1. An image processing device comprising:
    a processor, wherein the processor implements:
        an edge image generation part configured to detect an edge in an original image and to generate an edge image constituted from the detected edge;
        a connected pixel extraction part configured to extract connected pixel groups in the edge image;
        a binary image generation part configured to classify the connected pixel groups under respective colors of the connected pixel groups and to generate a character image being a binary image, for each of the colors;

a background image generation part configured to generate a background image of the original image on the basis of the character image; and an image compression part configured to respectively compress image data of the character image and image data of the background image by compression manners that are different from each other; wherein the background image generation part generates the background image in which a pixel value at a position of the character image in the original image is set by an average value of the pixel values in the original image with regard to at least a portion of pixels around a rectangle circumscribing the connected pixel groups, and when respective four brightness values in the original image with regard to the pixels at four vertices of the rectangle circumscribing the connected pixel groups are all higher than a predetermined binary threshold value, the binary image generation part decides that the connected pixel groups is correspondent to an ordinary character and generates the character image;

when the four brightness values are all lower than the predetermined binary threshold value, the binary image generation part decides that the connected pixel groups is correspondent to a density reversed character and generates the character image; and otherwise, the binary image generation part decides that the connected pixel groups is correspondent to a non-character and does not generate the character image.

2. The image processing device according to claim 1, further comprising:

a connected image combining part configured to detect the connected pixel groups whose respective circumscribing rectangles are close to each other and to group those connected pixel groups as one connected pixel group, wherein the binary image generation part classifies the grouped connected pixel group and not-grouped connected pixel group under the respective colors of the connected pixel groups, and generates the character image for each of the colors, and the background image generation part generates the background image in which a pixel value at a position of the character image in the original image is set by an average value of the pixel values in the original image with regard to at least a portion of pixels around a rectangle circumscribing the grouped connected pixel group.

3. The image processing device according to claim 1, wherein the background image generation part generates the background image in which a pixel value at the position of the character image in the original image is set by an average value of the pixel values in the original image with regard to all of the pixels around the rectangle.

4. The image processing device according to claim 1, wherein the background image generation part generates the background image in which a pixel value at the position of the character image in the original image is set by an average value of the pixel values in the original image with regard to four pixels at four vertices of the rectangle.

5. The image processing device according to claim 1, wherein the original image is a multi-valued color image; and the edge image generation part generates an image having a brightness component of the original image, detects an edge in the generated image, and then generates an edge image constituted from the detected edge.

* * * * *